United States Patent [19]

Strang

[11] Patent Number: 4,617,033

[45] Date of Patent: Oct. 14, 1986

[54] ARC WELDING FILTER

[76] Inventor: Virgil G. Strang, P.O. Box 327, Ocheyedan, Iowa 51354

[21] Appl. No.: 679,474

[22] Filed: Dec. 7, 1984

[51] Int. Cl.[4] .............................................. B03C 1/02
[52] U.S. Cl. ...................................... 55/100; 55/267;
55/385 R; 55/473; 55/484; 98/115.4;
219/137.41
[58] Field of Search ..................... 55/100, 385 R, 267,
55/473, 419, 484; 98/115.4; 219/137.41

[56] References Cited

U.S. PATENT DOCUMENTS

| 1,005,005 | 10/1911 | Dillon | 55/419 |
| 3,421,666 | 1/1969 | Lawson | 55/100 |
| 3,898,414 | 8/1975 | Hawley | 55/385 R |
| 3,911,242 | 10/1975 | Strang | 219/137.41 |
| 4,057,705 | 11/1977 | Cockrum | 219/137.41 |
| 4,496,823 | 1/1985 | Mann | 219/137.41 |

FOREIGN PATENT DOCUMENTS

| 2343098 | 3/1975 | Fed. Rep. of Germany | 219/137.41 |
| 622600 | 7/1978 | U.S.S.R. | 219/137.41 |

Primary Examiner—Bernard Nozick

[57] ABSTRACT

A device intended to remove pollutants from the gases surrounding an arc welding operation comprising principally a blower adapted to draw the gases away from the welding operation. The gases are drawn into an inlet located near the work area through a hose having coils adapted to absorb heat from the gases. A filter using both magnetic and mechanical means is used to filter the pollutants from the gases before discharging into the ambient atmosphere.

6 Claims, 5 Drawing Figures

ARC WELDING FILTER

BACKGROUND AND SUMMARY OF THE INVENTION

This invention pertains to filtering devices and more particularly to a device using both magnettic and heat resistant mechanical filters to remove particulate material from the gases surrounding an arc weld, and is disclosed in Disclosure Document Ser. No. 118,383 filed in the United States Patent Office on June 23, 1983.

The operation of electrical arc welding creates a number of environmental problems. Much of the problem stems from gases and entrained particulates which may cause discomfort or even illness to those present in the area around the welding.

Among the problems caused by arc welding operations are the fumes created at the arc combined with spattering of metal around the arc or the scattering of other dust or impurities from the general area of the weld. The material may be heated by the arc to the point where it is substantially liquified or vaporized. This may also cause very small solid particles to be entrained in a rapidly moving air stream so that it can be sucked away from the area of the weld.

By my device I do just that. I provide for a rapidly moving air stream to pick up the gases and entrained material from the immediate area of the welding operation and then to drive those gases through a filter using both a magnet to remove the magnetically sensitive material and a heat resistant mechanical filter to remove other particulates before discharging the gases into the ambient atmosphere.

FIGURES

DESCRIPTION

Figure 2:
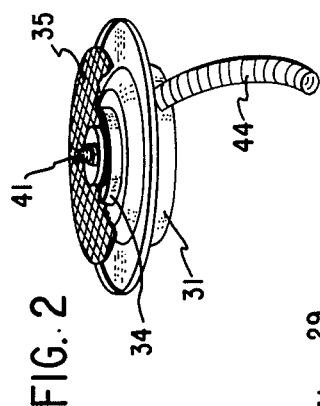
FIG. 2 is a view of the filter base removed from the cover to show the filter elements.

Briefly my invention comprises a device for removing particulate matter from the gases surrounding an arc welding operation by sucking the gases from the area of the weld and then forcing those gases through a dual filter.

More specifically and referring to the drawings, I provide a base 10 on which the device is mounted. A housing 11 is mounted on the base and covers a conventional motor 8 which drives a fan 9 similar to that of a vacuum cleaner. Power is provided through a cord 12 from a conventional electrical outlet. A switch 13 is provided to control operation of the fan.

The intake of the fan draws air from the housing 11 through a flexible hose 15. This hose terminates at its outer end in a welding tip nozzle 16. The nozzle includes an electrode holder 17 of common form adapted to hold a welding rod 18. The rod 18 extends through an opening 19 in the nozzle so that a small amount of air may be sucked through that opening and into the hose 15 and thence through the fan. An insulating grommet 14 is provided at the end of the nozzle 16 to provide electrical insulation between the tip of the nozzle and the welding rod 18. The holder 17 is housed in ferrule 20 adapted to be threadably attached to the hose 15 by means of internal thread 21 formed on this ferrule 20.

An additional tube or hose 22 is also provided. This tube also is preferably flexible and is attached to the main hose 15 so that any reduced pressure in the hose 15 will be present in the additional hose 22. This hose 22 also terminates in a nozzle 23 adapted to draw air or other fumes and gases into the hose 22 and thence into the hose 15. A small magnet 24 may be attached to the nozzle 23. By this means the nozzle 23 may be placed and removably held onto one of the parts to be welded or to an adjacent table or support means for those parts. The magnet 24 therefore provides that the nozzle will be held in place on that piece.

Figure 3:
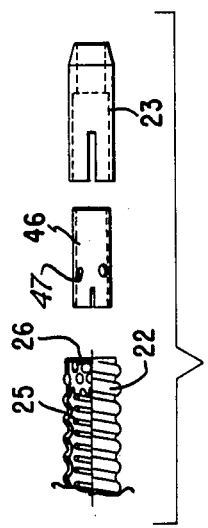
FIG. 3 is a separated view of the vacuum nozzle.

Some means to provide cooling of the gases within the hose 22 particularly should be provided. I prefer to do this by providing a heat-conducting spring 25 (FIG. 3) within the hoses in a position near the nozzle 23. This spring serves to conduct heat away from the gases and fumes being sucked from the arc and thus to reduce the temperature within the hoses. I also provide a perforated, heat-conducting insert 26 within the hose 22 for the dual purpose of entrapping larger particles and also to absorb some of the heat in the gases and material sucked through the nozzle 23. Thus, damage to the hose from excess heat is avoided. The nozzle also has a liner 46 which is perforated by holes 47. The liner is formed of a heat resistant material, but is perforated to provide additional means to carry away the heat. Other types of heat sink devices might be used, but I have found the spring to be effective and sufficient for the purpose.

Power to the rod 18 for welding is transmitted through a power cord 27 extending through the hose 15. A connector 28, adapted to be disconnected, connects the cord 27 to the holder 17 and thence to the rod 18 in a manner well-known in the art.

The air and the entrained impurities drawn through the hoses 22 and 15 are discharged from the fan and thence pushed though an exit tube 28 and into the filter 29. It will be evident that screen means at the entrance to the fan within the housing 11 may be used both to protect the fan from coarse particles and from heat.

The filter consists of a cover 30 and a base 31. The cover includes an inlet 48 through which the gases enter the filter. A baffle 49 serves to distribute those gases around the cap so that they are not all concentrated in one part of the filter. Approximately midway between the base and the cover is a plate 32 having holes 33 through which the air can pass. Both above and below the plate, I provide a magnet 34 in the form of a ring. This magnet will attract and hold any particulate magnetic material which contacts it so that particles from iron or steel or other magnetic sensitive material which are blown through the filter will not be discharged into the air. In addition to the magnets. I provide filter mterial both above and below the plate. I have illustrated a screen-type filter 35 above the plate and loose or padded filter materials 36 below the plate. It is not my intention by this illustration to limit the filtering arrangement nor the construction of the filter. Rather, I choose to illustrate two types of construction to demonstrate that any filter which will accomplish the purpose may be used. It may be noted that the gases passing through the filter may still be relatively hot. Therefore, I use a material capable of withstanding the temperatures encountered within the filter.

Figure 1:
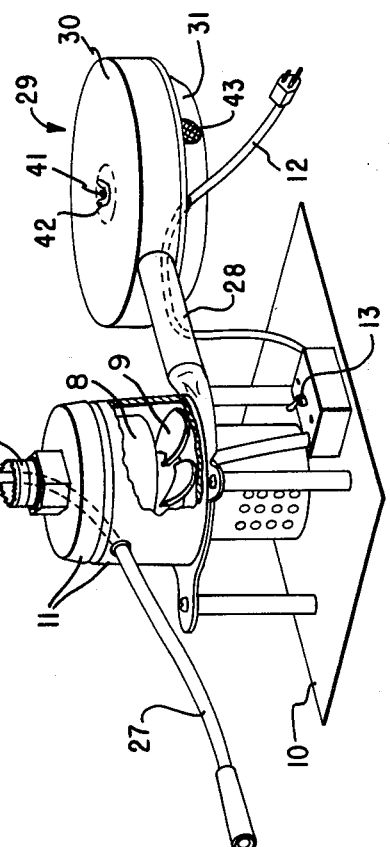
FIG. 1 is a pictorial view of the device fully assembled.

The filter may be held together in different ways also. In my prototype, I use a series of bolts 39 extending through a flange 40 on the base 31 to hold the base to the plate 32. The plate is held to the cover 30 by means of a bolt 41 extending through the plate 32, the upper magnet 34, the screen 35 and the cover 30. A wing nut 42 (FIG. 1) is then used to hold the filter in place on the cover. The lower magnet 34 may be centered on a boss on the base 31 or on the head of the bolt 41 or by other similar means.

After the air has passed through the filtering means, it is discharged through an opening 43 in the base 31 of the filter. I prefer to use a hose 44 to conduct the discharge away from the mechanism. This hose could extend to a ventilation system, to the exterior of a wall or to any other convenient place for discharge. Because of the use of a single central bolt 41, to connect the base to the rest of the mechanism. I can rotate the base for alignment of the hose 44 with a ventilation system if desired.

I claim as my invention:

1. Means for cleaning the air round and the surface of a welding workpiece comprising a fan, housing means surrounding said fan and defining an inlet to said fan, flexible tubular means connected to said housing at said inlet for conducting air and entrained material to said inlet, electrical means located within said tubular means, said conducting means having one end adapted to be connected to a welding power supply, welding rod holding means located at the end of said tubular means opposite said fan inlet, said rod holding means being in electrical connection with said conducting means, said housing means also defining a discharge from said fan, filter means connected to said discharge to receive air from said fan and to filter said air, branch flexible tubular means leading away from said first named tubular means, and a nozzle on said branch tubular means opposite the juncture between the two tubular means, said tubular means being flexible so that said nozzle can be placed adjacent said rod holding means.

2. The device of claim 1 in which a magnet is fixed to said nozzle whereby said nozzle may be held in place on a ferrous workpiece.

3. The device of claim 1 in which heat conducting means is located within said nozzle to protect said hose from excess heat.

4. The device of claim 3 in which said heat conducting means a spring-like device coiled within said nozzle.

5. The device of claim 1 in which said filter includes a cap and a base, said cap being attached to the housing at said discharge, said base being removably attached to said cap and containing a magnetic filter and a mechanical filter, said base being formed to provide a discharge opening.

6. The device of claim 5 in which discharge hose means leads from said discharge opening.

* * * * *

UNITED STATES PATENT AND TRADEMARK OFFICE
CERTIFICATE OF CORRECTION

PATENT NO. : 4,617,033

DATED : October 14, 1986

INVENTOR(S) : Virgil G. Strang

It is certified that error appears in the above-identified patent and that said Letters Patent is hereby corrected as shown below:

In column 2 of the Description, line 35, remove the "8" from the two digit reference member "28', leaving the sole number —2— identifying the connector.

Figure 4:
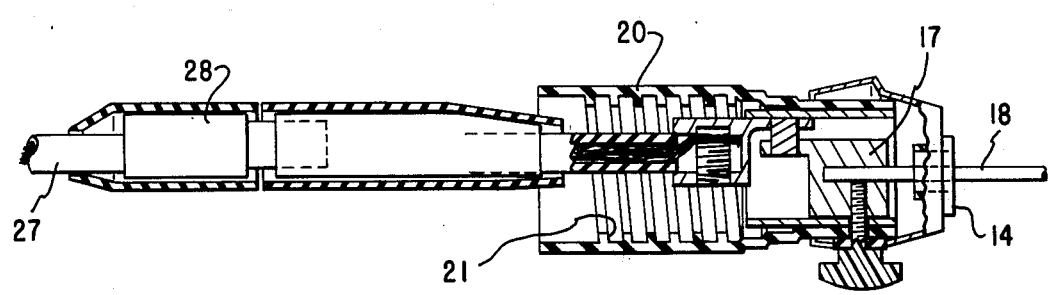
FIG. 4 is a sectional view of the welding tip nozzle.
Figure 5:
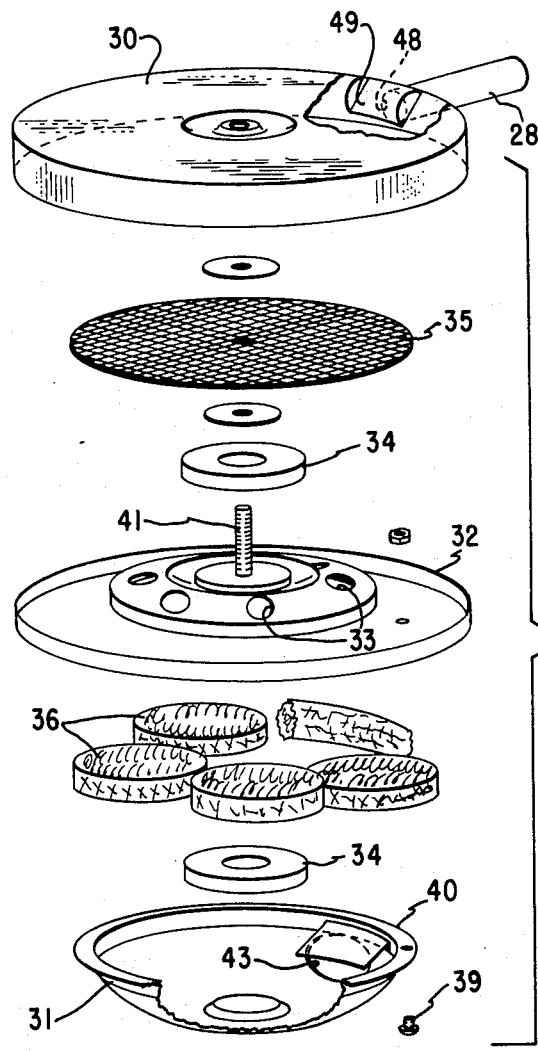
FIG. 5 is an exploded view of the filter device.

On the Drawing, sheet 2 of 2, Fig. 4, remove the "8" of the reference member number "28" leaving the sole number —2— identifying the connector.

On the Drawing, sheet I of 2, Fig. I, the reference member "24", the power cord, should read —27— as sighted in the Description and Fig. 4, sheet 2 of 2 in the Drawing.

In patent claim I, column 3, line 22, add the letter —a— to complete the word "around".

In patent claim I, column 3, line 27, should read, in part, " electrical conducting means" by adding the word —conducting— after the word electrical.

In patent claim 4, column 4, line 20, add the word is after the word means (—is—) but before a, reading " means is a ".

Signed and Sealed this

Third Day of March, 1987

*Attest:*

DONALD J. QUIGG

*Attesting Officer*     *Commissioner of Patents and Trademarks*